(12) United States Patent
Hutchinson et al.

(10) Patent No.: US 7,744,231 B2
(45) Date of Patent: Jun. 29, 2010

(54) ELECTRICAL CONNECTOR WITH ILLUMINATION WAVEGUIDE

(75) Inventors: Timothy Alan Hutchinson, Bingham Farms, MI (US); Robert Colantuono, Harrisburg, PA (US); Michael McKee, Harrisburg, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 13 days.

(21) Appl. No.: 11/906,385

(22) Filed: Oct. 1, 2007

(65) Prior Publication Data

US 2009/0086469 A1 Apr. 2, 2009

(51) Int. Cl.
*F21V 33/00* (2006.01)
(52) U.S. Cl. .......................... 362/95; 362/555; 362/657
(58) Field of Classification Search .................. 362/95, 362/551, 555, 557, 558, 581, 652, 657, 658, 362/659; 439/488, 490, 491, 489, 910
See application file for complete search history.

(56) References Cited

U.S. PATENT DOCUMENTS

| | | | | |
|---|---|---|---|---|
| 2,612,597 | A | * | 9/1952 | Sherrard ...................... 362/95 |
| 6,159,037 | A | * | 12/2000 | Madsen et al. ............... 439/490 |
| 6,336,825 | B1 | * | 1/2002 | Seefried ...................... 439/488 |
| 7,175,327 | B1 | * | 2/2007 | Tsai ............................ 362/555 |

* cited by examiner

*Primary Examiner*—Y My Quach Lee
(74) *Attorney, Agent, or Firm*—Ming Chieh Chang; Wei Te Chung; Andrew C. Cheng

(57) ABSTRACT

An electrical connector including a connector subassembly having a front mating portion and a waveguide disposed around the front mating portion of the connector subassembly. The waveguide may alternatively be disposed near the front mating portion of the connector subassembly and an illumination device is provided at the side portion of the connector subassembly adjacent to the waveguide for coupling light emanating therefrom onto a portion of the waveguide which in turn conducts the light to illuminate at least a front end of the waveguide. The connector subassembly may further cooperate with a bezel having a frame and an opening. The frame retains the connector subassembly in position with the front mating portion of connector subassembly extending to the opening. The waveguide is then configured to have a front portion disposed between a rim portion of the opening and the front mating portion of the connector subassembly.

20 Claims, 12 Drawing Sheets

US 7,744,231 B2

ELECTRICAL CONNECTOR WITH ILLUMINATION WAVEGUIDE

BACKGROUND OF THE INVENTION

1. Field of the Invention

The present invention generally relates to an electrical connector with illumination source, and more particularly to an electrical connector having an integrated waveguide for use in poorly lit environment, such as in a car.

2. Description of Prior Art

An electrical connector, such as a cable assembly with an Universal Serial Bus (USB) connector, has been used in electronics for years. Since devices such as cell phones, MP3, IPOD, and DVD player, are widely used in daily life, the auto industry is upgrading the electronics to meet this rising demand. More and more USB connectors are appeared in auto industry to meet the harsh environments of the auto industry. The current cable system is connected from the back of the radio system to the dash board through a bezel to which the electrical connector or more particularly the cable connector is latched. This will allow the consumer to plug in their electronic devices for downloading information, music, etc. However, while driving a car in darkness, it is difficult to find the right position of the inserting opening of the USB connector.

Hence, it is desirable to have an improved electrical connector, such as a cable end connector, that is equipped with an illumination source or a waveguide around the electrical connector for ease of access by a mating connector.

BRIEF SUMMARY OF THE INVENTION

Accordingly, a main object of the present invention is to provide a cable connector assembly capable of showing its position in darkness.

In order to achieve the above-mentioned object, in one aspect, an electrical connector in accordance with the present invention comprises a connector subassembly having a front mating portion and a waveguide disposed around the front mating portion of the connector subassembly. In accordance with another aspect of the present invention, an electrical connector comprises a connector subassembly having a side portion and a front mating portion, a waveguide disposed near the front mating portion of the connector subassembly, and an illumination device disposed at the side portion of the connector subassembly adjacent to the waveguide for coupling light emanating therefrom onto a portion of the waveguide which in turn conducts the light to illuminate at least a front end of the waveguide. In accordance with still another aspect of the present invention, an electrical connector assembly comprises: a connector subassembly having a front mating portion; a bezel having a frame and an opening, the frame retaining the connector subassembly in position with the front mating portion of connector subassembly extending to the opening; and a waveguide having a front portion disposed between a rim portion of the opening and the front mating portion of the connector subassembly.

Other objects, advantages and novel features of the invention will become more apparent from the following detailed description of the present embodiment when taken in conjunction with the accompanying drawings.

DETAILED DESCRIPTION OF THE INVENTION

Figure 1:
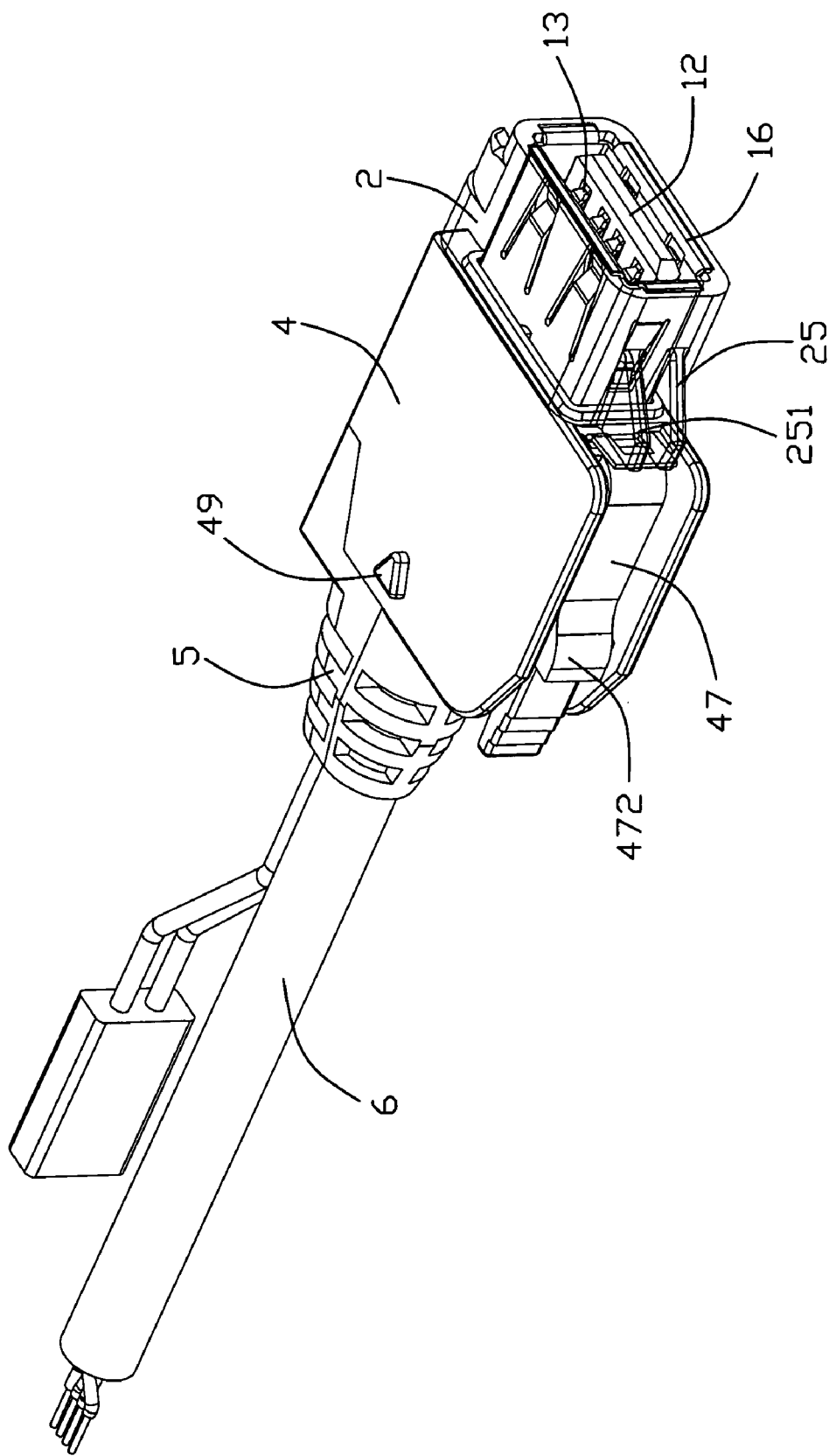
FIG. 1 is a perspective view of a cable connector in accordance with the present invention.

Reference will now be made to the drawing figures to describe the present invention in detail.

Figure 5:
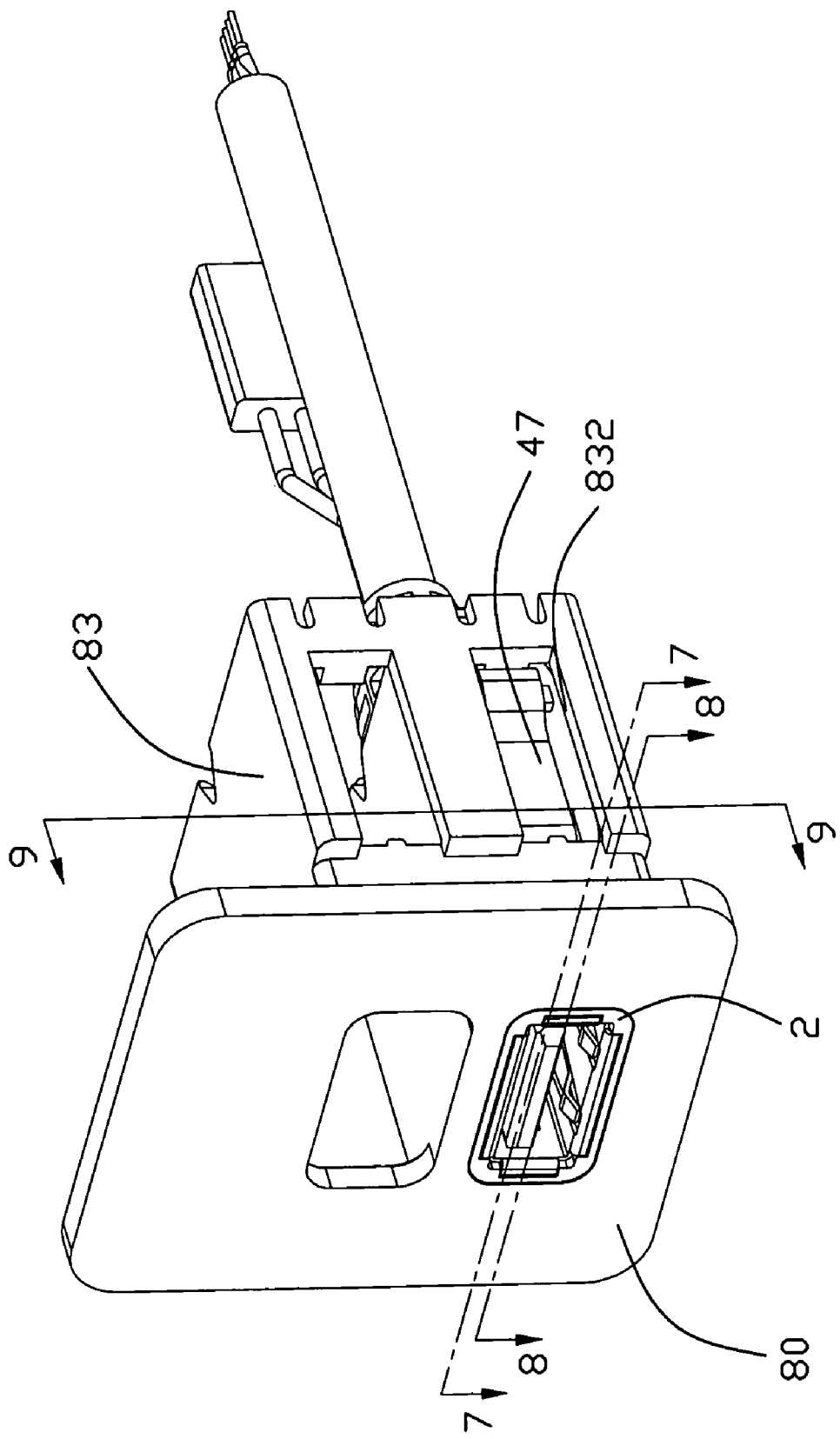
FIG. 5 is a perspective view of the cable connector mounted on a bezel in accordance with the present invention.
Figure 6:
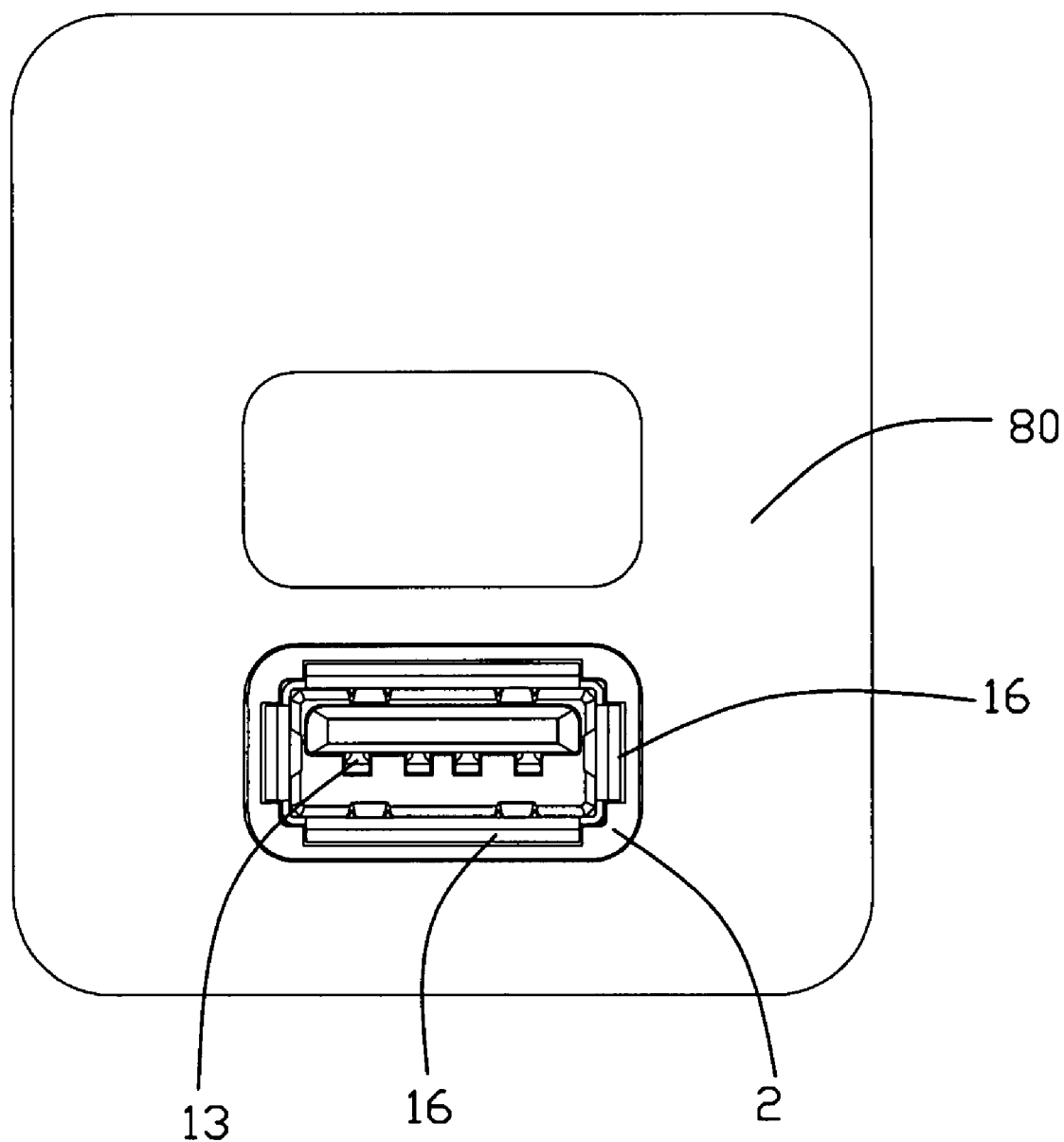
FIG. 6 is a front elevation view of the cable connector and bezel combination shown in FIG. 5.

Referring to FIG. 1 and FIG. 5, an electrical connector, a cable connector in this embodiment shown, is to be latched to a bezel 8 so as to mate with a complementary connector (not shown) inserted in a front-to-back direction from an opposite side of the bezel 8. The bezel 8 then may be suitably mounted to another faceplate or a car dash board (not shown). The connector comprises a connector subassembly and a waveguide 2 disposed around a front mating portion of the connector subassembly.

Figure 2:
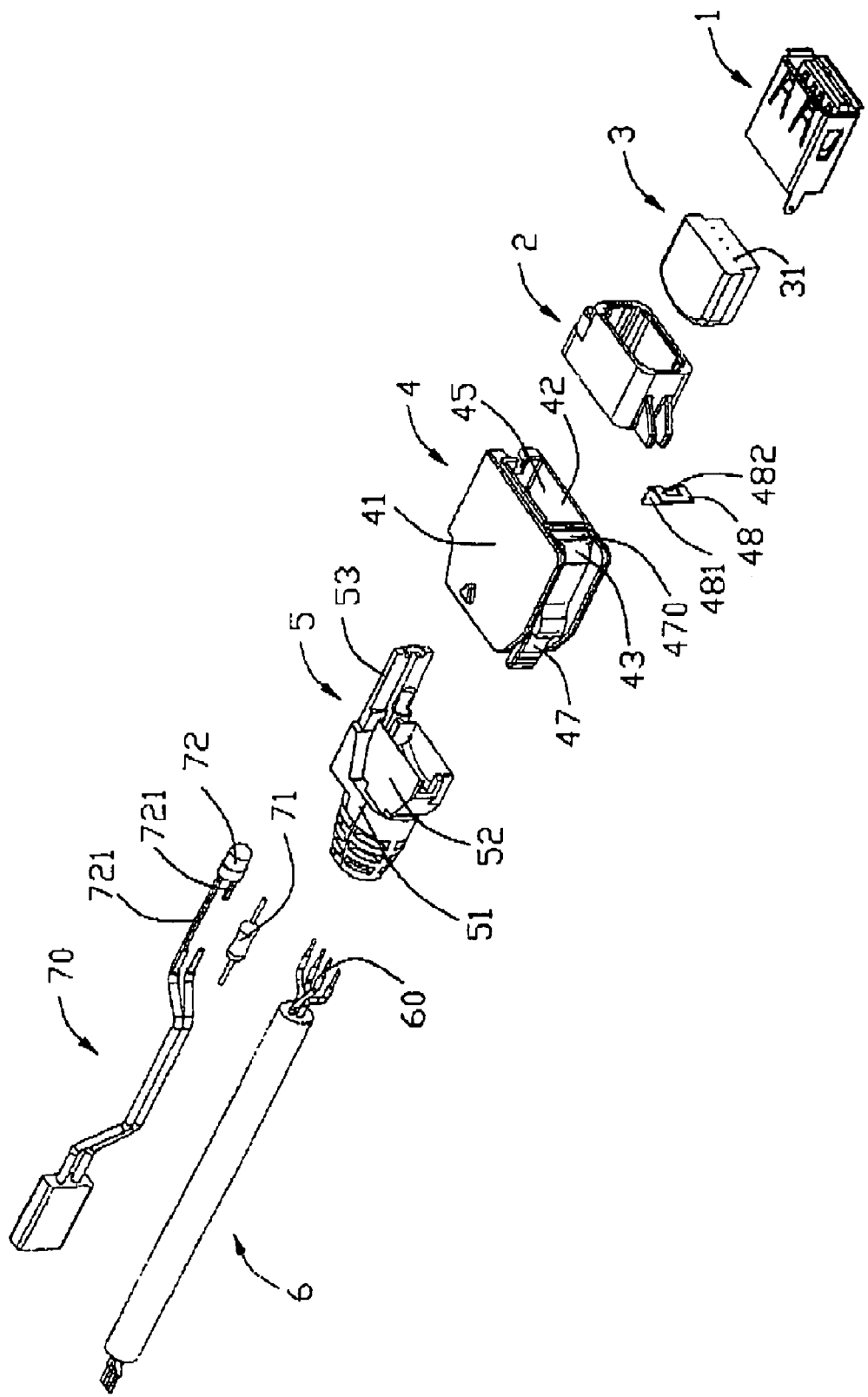
FIG. 2 is an exploded, perspective view of the cable connector shown in FIG. 1.

Turning now to FIG. 2, the connector subassembly comprises in this embodiment a USB electrical connector 1 of generally known construction, a spacer 3 molded over a junction portion of a cable 6 and electrical contacts of the connector 1. Cooperating with the waveguide 2, a front cover 4 separately enclosing the connector subassembly or constituting a part of the connector assembly is provided. The cover 4 is preferably a pre-made piece that is assembled rearwardly of the waveguide 2 after the waveguide 2 has been mounted to the front mating portion of the connector subassembly, namely the shielding shell of the USB connector 1. An illumination device 70 in the form of an LED (Light Emitting Diode) 72 and related wiring and connectors is disposed at a side portion of the connector subassembly, preferably on the cover 4. After mounting the illumination device 70 to the cover 4, a rear cover 5 is molded over the cable 6 and portions of the illumination device 70 and the front cover 4 to complete an electrical connector assembly with illumination source.

Figure 3:
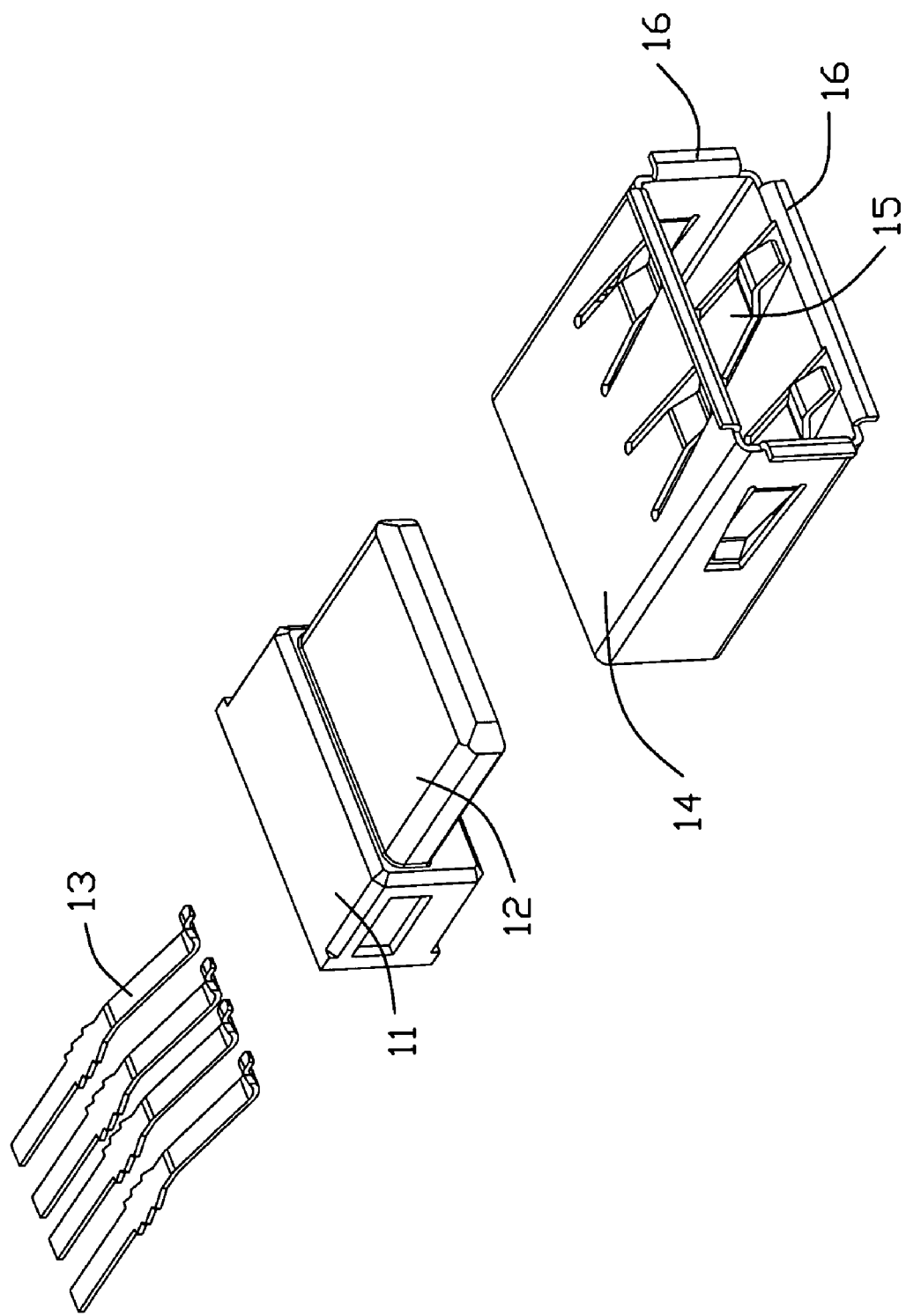
FIG. 3 is an exploded, perspective view of a USB connector constituting part of the cable connector shown in FIG. 1.

As shown in FIG. 3, the electrical connector 1 comprises a dielectric housing having a main body 11 and a tongue 12 extending from the main body 11, a plurality of terminals 13 received in the main body 11 and the tongue 12, and a metallic shell 14 enclosing the main body 11 and the tongue 12. The shielding shell 14 defines a front mating portion 15 for insertion of a complementary connector and has one or more stopping plate 16 around a front end of the mating portion 15.

Figure 11:
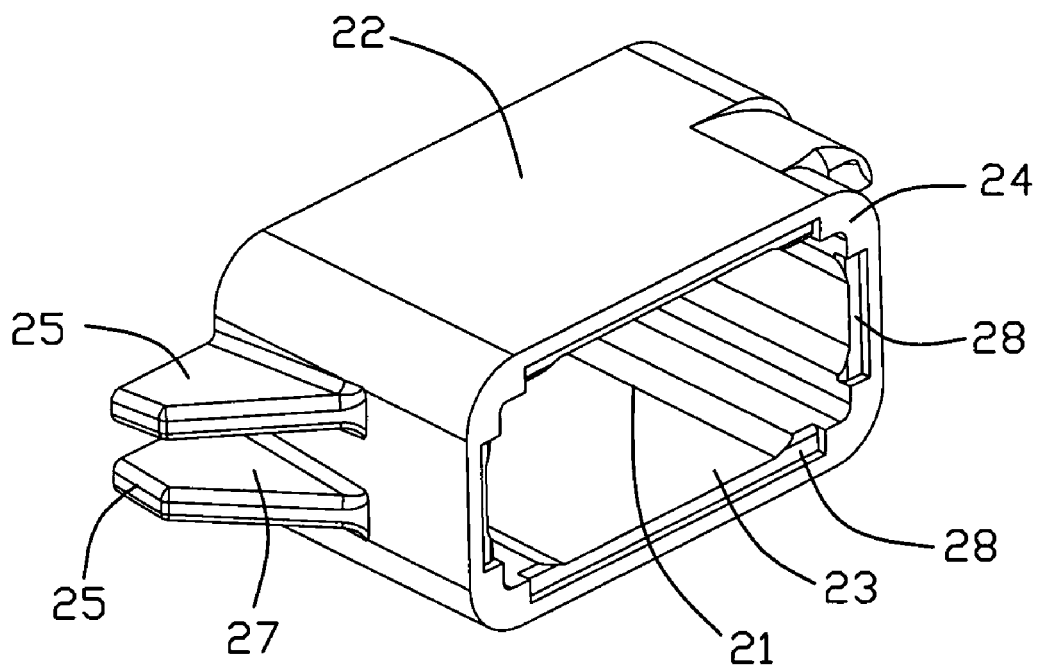
FIG. 11 gives two perspective views of a waveguide of the cable connector.
Figure 11:
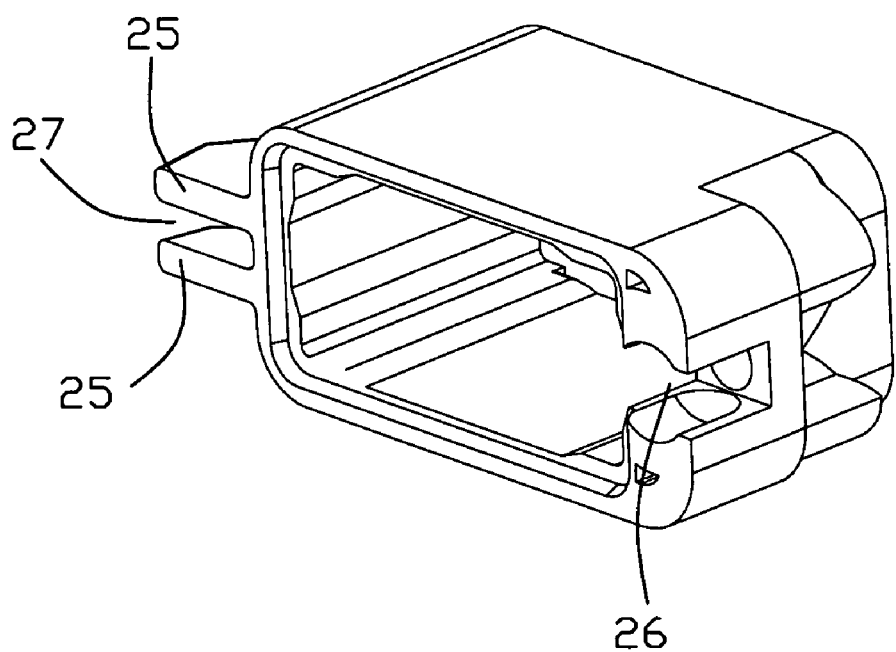

Referring to FIG. 11, the waveguide 2 is configured substantially as a rectangular ring or sleeve having a receiving slot 21 along the front-to-back direction for sliding onto or encasing the front end of the connector shell 14 from a rear thereof. The waveguide 2 comprises a top wall 22, a bottom wall 23, a pair of side walls 24 connecting the top and the bottom walls 22, 23, two fins 25 extending laterally from one of the side walls 24, and a receiving slit 26 provided at the other side wall 24. The fins 25 are arranged side by side along an up-to-down direction perpendicular to the front-to-back direction to define a gap 27 therebetween. The gap 27 slightly diverges toward a front of the fins 25 for creating a wedging action with an internal feature of the bezel 8 for centering or stabilizing purpose when the waveguide 2 is mounted to the bezel 8. The front end face of the waveguide 2 defines one or more retaining cutouts 28 at an edge thereof for seating corresponding stopping plate 16 of the electrical connector 1. The waveguide 2 is preferably made of translucent or transparent material.

Turning back to FIG. 2 again, the spacer 3 is generally an overmolded piece as mentioned above and as shown, for ease of explanation, comprises a plurality of passageways 31 for passage by the wires 60 of the cable 6.

Figure 4:
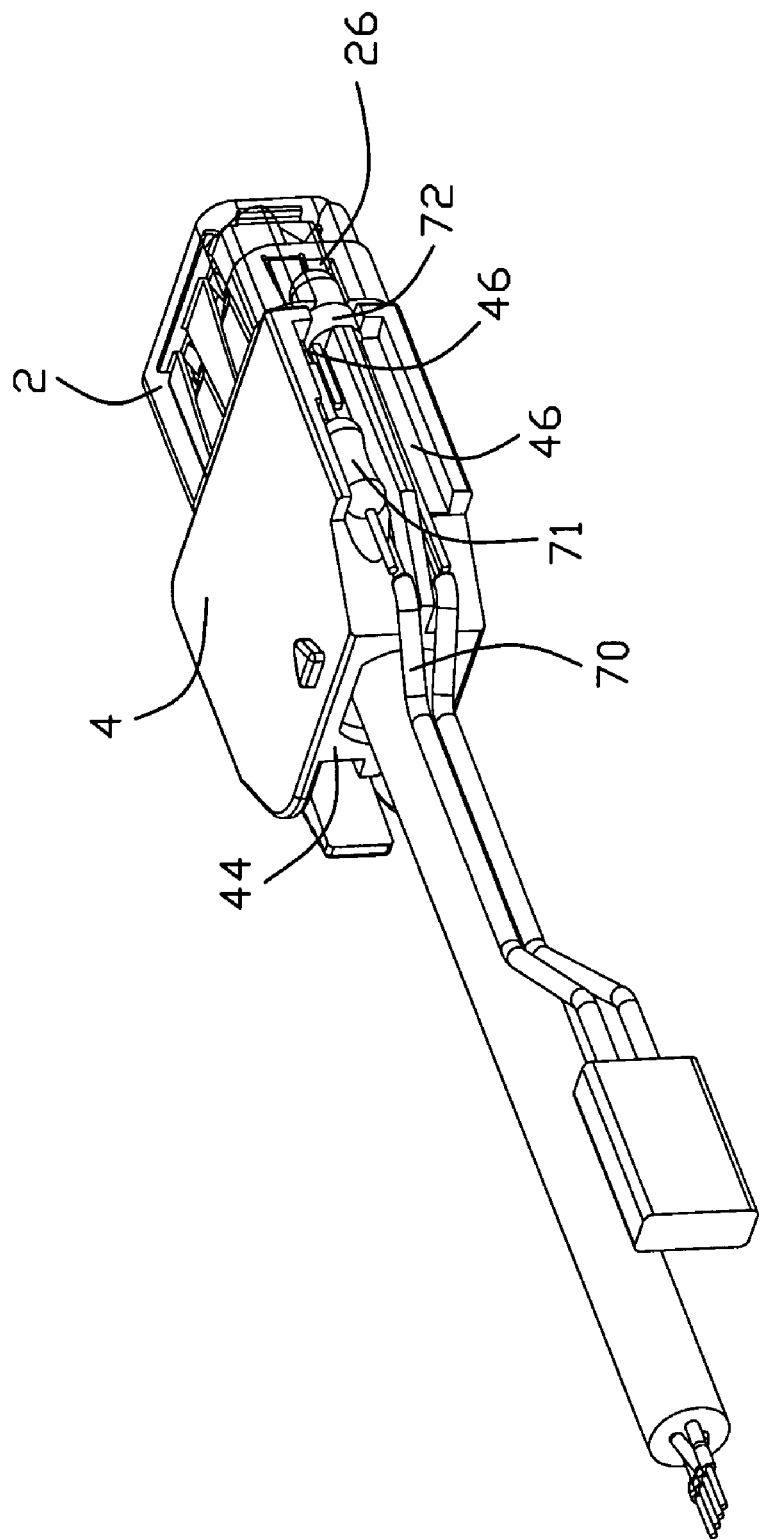
FIG. 4 is another perspective view of the cable connector with its rear cover removed for clarity.

Still referring to FIG. 2 in conjunction with FIG. 4, the cover 4, bearing against the rear face of the waveguide 2, comprises a top portion 41, a bottom portion 42, two side portions 43 connecting with the top and the bottom portions 41, 42, and a rear portion 44. These portions together define a receiving space 45. One of the side portions 43 forms a pair of passages 46 extending along the front-to-back direction and communicating with the receiving slit 26 of the waveguide 2. The other side portion 43 forms a latching member 47 with a receiving cavity 470 defined on a front end thereof. The latching member 47 is capable of moving along a lateral direction. The cover 4 further comprises an over-travel spring 48, which comprises a retaining portion 481 and a resilient engaging portion 482 extending laterally from the retaining portion 481. The retaining portion 481 is retained in the receiving cavity 470, and the engaging portion 482 may or may not resist the fins 25 of the waveguide 2 (shown in FIG. 1) when the connector subassembly has not been assembled to the bezel 8. In the case of engagement between the spring 48 and the fins 25, the fins 25 will help keeping the spring 48 in position to the cover 4. Additionally, a triangular protuberance 49 is formed at the center of the top portion 41 of the cover 4, serving as a centering feature between the connector and the bezel 8 to which the connector is assembled.

The rear cover 5 comprises a strain relief 51 itself generally of a known construction, a base 52 extending forwardly from the strain relief 51, a beam 53 extending forwardly from the strain relief 51 beside the base 52. As mentioned above, the rear cover 5 is preferably an overmolded piece cooperating with the front cover 4 to retain at least part of the illumination device 70.

The cable 6 comprises four wires 60, for the exemplary USB connector 1 shown, extending through the strain relief 51, the base 52 of the rear cover 5, and the spacer 3 in sequence to finally electrically connect with corresponding terminals 13 of the electrical connector 1.

Referring to FIG. 4, the illumination device or source 70 in the embodiment comprises a pair of conducting wires, a resistor 71, and an LED 72. The LED 72 is placed in the receiving slit 26 of the waveguide 2 with two pins 721, respectively, located in the two passages 46 of the front cover 4. The resistor 71 electrically connects with one pin 721 of the illumination device 72 and is also received in one passage 46 of the cover 4. One of the conducting wires electrically connects with one pin 721 of the LED 72, while the other pin 721 electrically connects with the resistor 71 and then to the other wire. The beam 53 of the rear cover 5 is configured to generally cover the pins 721 of the LED 72, the resistor 71 and portions of the conducting wires. It is noted that the illumination device may be separately provided, if desired, and then have the LED install to the waveguide 2 instead of integrating the illumination device and overmolding the same by the rear cover. As can be understood, the wiring of the illumination device is application specific and may be suitably configured routed through for example another connector (not labeled) depicted in some drawing figures for further processing. Moreover, while an LED is specifically shown, it is understood that other lighting portion such as fiber optics based, is also contemplated without departing from the present invention.

Figure 7:
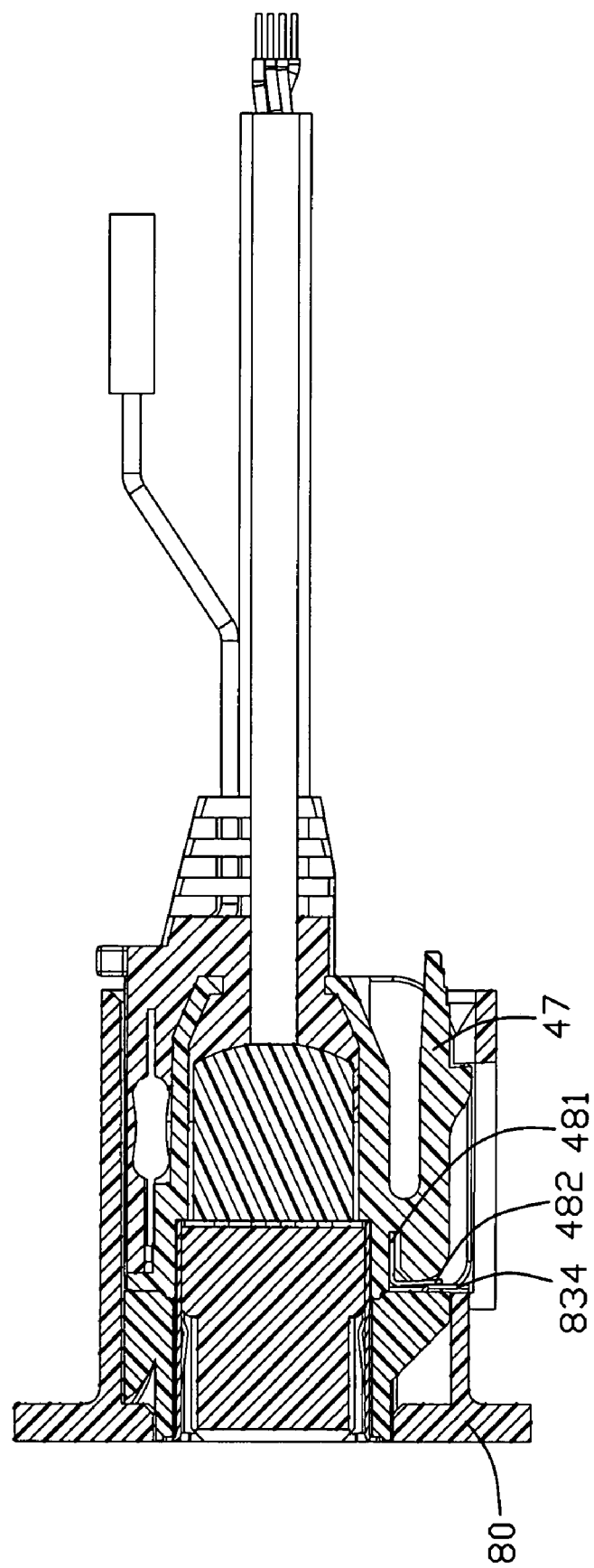
FIG. 7 is a cross-sectional view taken along line 7-7 in FIG. 5.
Figure 8:
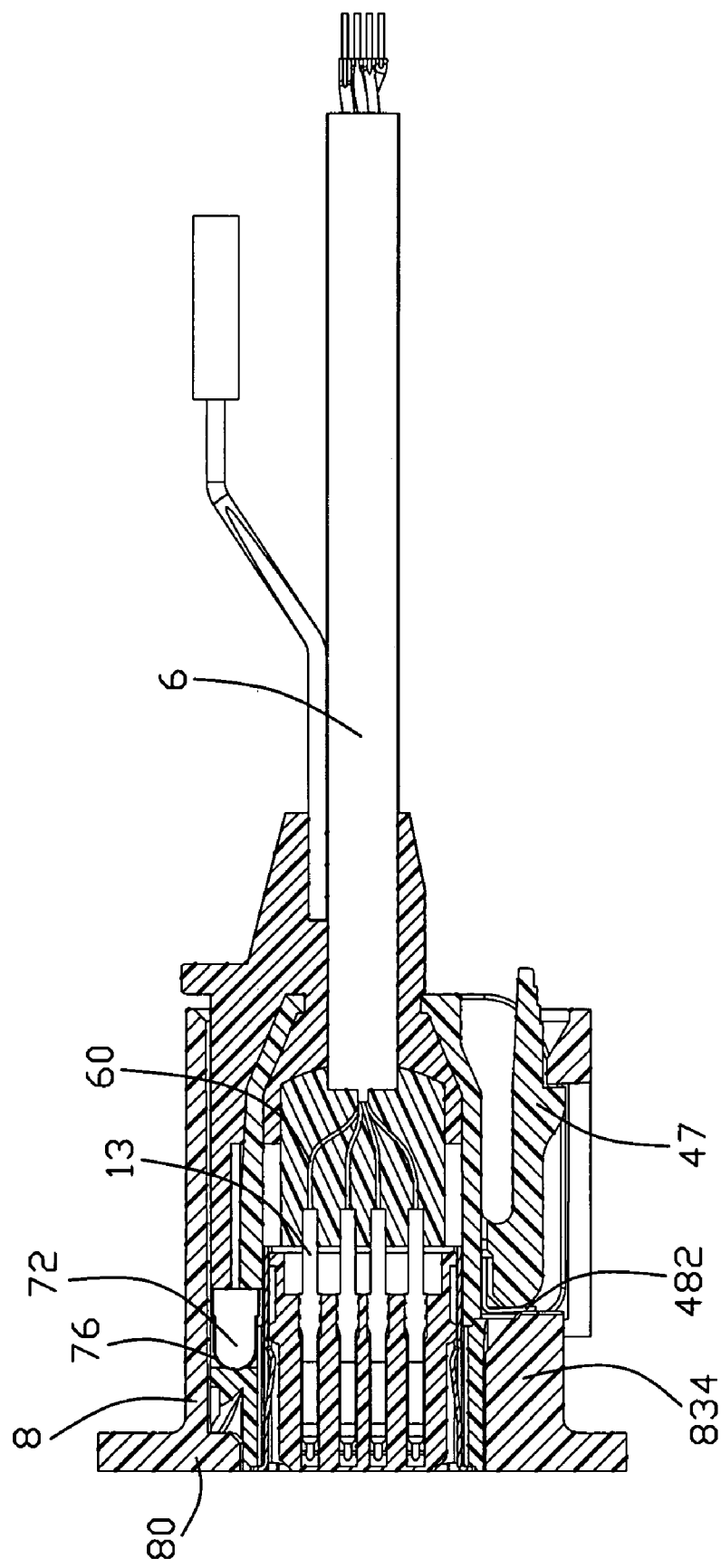
FIG. 8 is a cross-sectional view taken along line 8-8 in FIG. 5.
Figure 9:
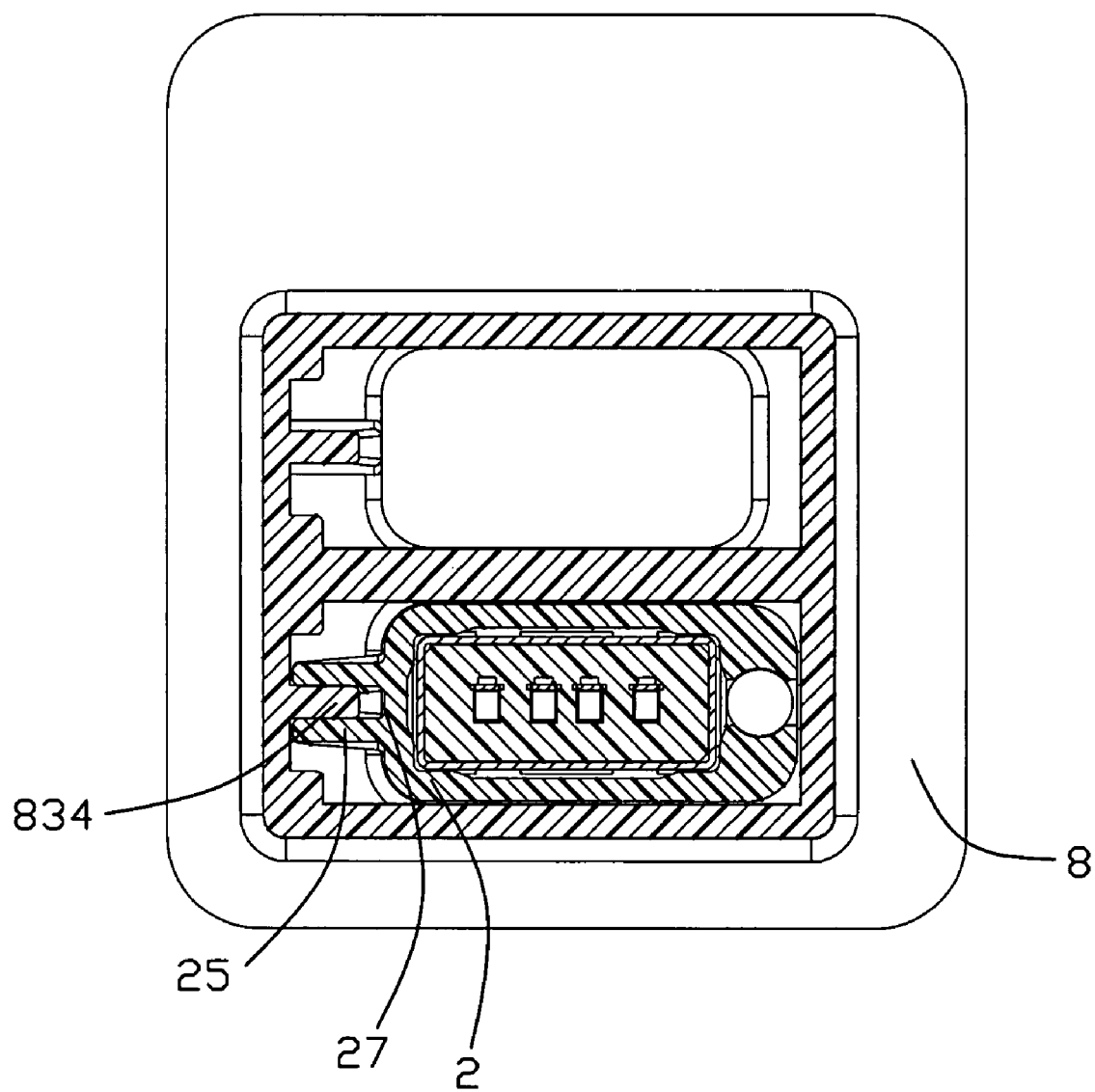
FIG. 9 is a cross-sectional view taken along line 9-9 in FIG. 5.
Figure 10:
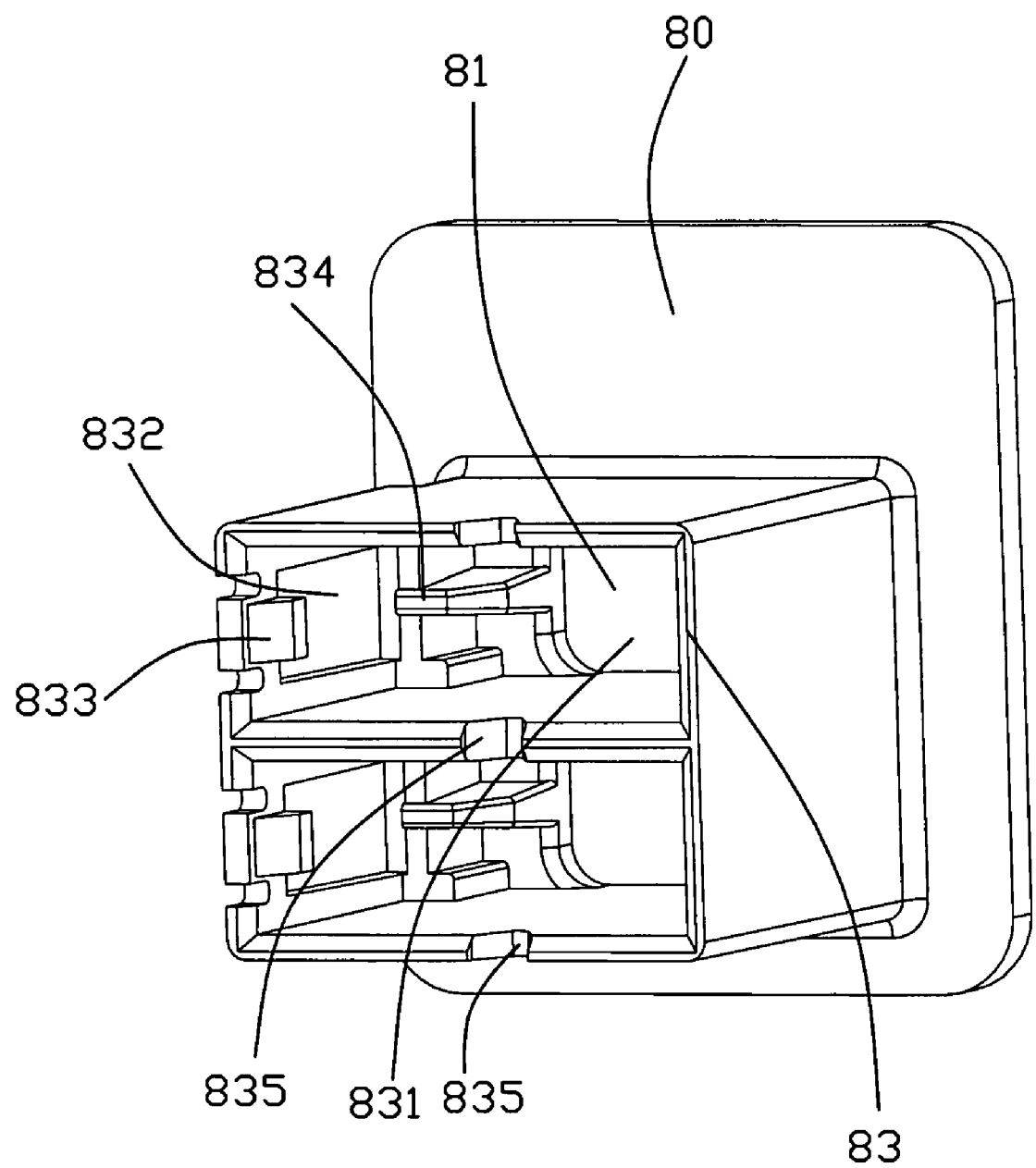
FIG. 10 is a rear perspective view of the bezel.

Referring to FIGS. 1, 5, 6 and 10, the bezel 8 comprises a vertical plate 80, a mating opening 81 defined through the perpendicular plate 81, and a retaining frame 83 extending rearward from the plate 81. The waveguide 2 extends to the mating opening 81 with a front portion of the waveguide 2 being in substantially same vertical plane with a front face of the perpendicular plate 80. As can be seen in the figures, the front portion of the waveguide 2 is disposed between a rim portion of the opening 81 and the front mating portion 15 of the electrical connector 1. The retaining frame 83 defines one or more receiving rooms 831, a retaining cutout 832 at the lateral side thereof, and a stopper 833 behind the retaining cutout 832. The connector subassembly or system and the illumination device or source are partially received in the receiving room 831 with a block 472 of the latching member 47 projecting into the retaining cutout 832 and resisted by or locking with the stopper 833. The retaining frame 83 further has a tapered, projecting plate 834 projecting into the receiving room 831. As mentioned previously, the projecting plate 834 extends into the gap 27 and is sandwiched by the two fins 25 of waveguide 2 (shown in FIG. 9). Furthermore, the projecting plate 834 presses the engaging portion 482 of the over-travel spring 48 (shown in FIG. 7) to bias the front cover 4 and therefore the connector subassembly rearward, thus further stabilizing the connector subassembly in the bezel 8. With this construction, any movement resulting in unacceptable rattling noise is minimized. The wedge action created by the two fins 25 engaging with the tapered plate 834 further assist in alignment and press fit to one another to eliminate undesired relative movement. In one sense, the spring 48 is a secondary feature supplementing the latching member 47 by applying additional force to assure no undesired movement between the connector subassembly and the bezel 8. The bezel 8 further forms a plurality of cutouts or openings (not labeled) at the rear of the retaining frame 83. As a safeguard measure, the stopper 833 or the portion where the stopper is located is connected to the frame 83 through weak or easily broken limbs (not labeled) so that when the connector is accidentally pushed or subject to a strong rapid jerk action by way of the cable, the bezel 8 is easily broken than the dash board of the car. Understandably, replacing the bezel 8 is a lot cheaper than running a new cable through the car dash board. The bezel 8 further comprises a triangular recess 835 at the rear of the retaining frame 83 to mate with the triangular protuberance 49 of the front cover 4 for centering the front cover 4 with the bezel 8.

In assembling, firstly, the cable 6 with the wires 60 is soldered to the electrical connector 1, and then a dielectric material, in the final form of the spacer 3, is over-molded on the electrical connector 1. Secondly, the waveguide 2 and the front cover 4 are assembled on the electrical connector along the cable 6 and in a back-to-front direction. Thirdly, the illumination device placed beside the front cover 4 and the waveguide 2. Finally, the rear cover 5 is over-molded on the cable connector assembly.

Figure 12:
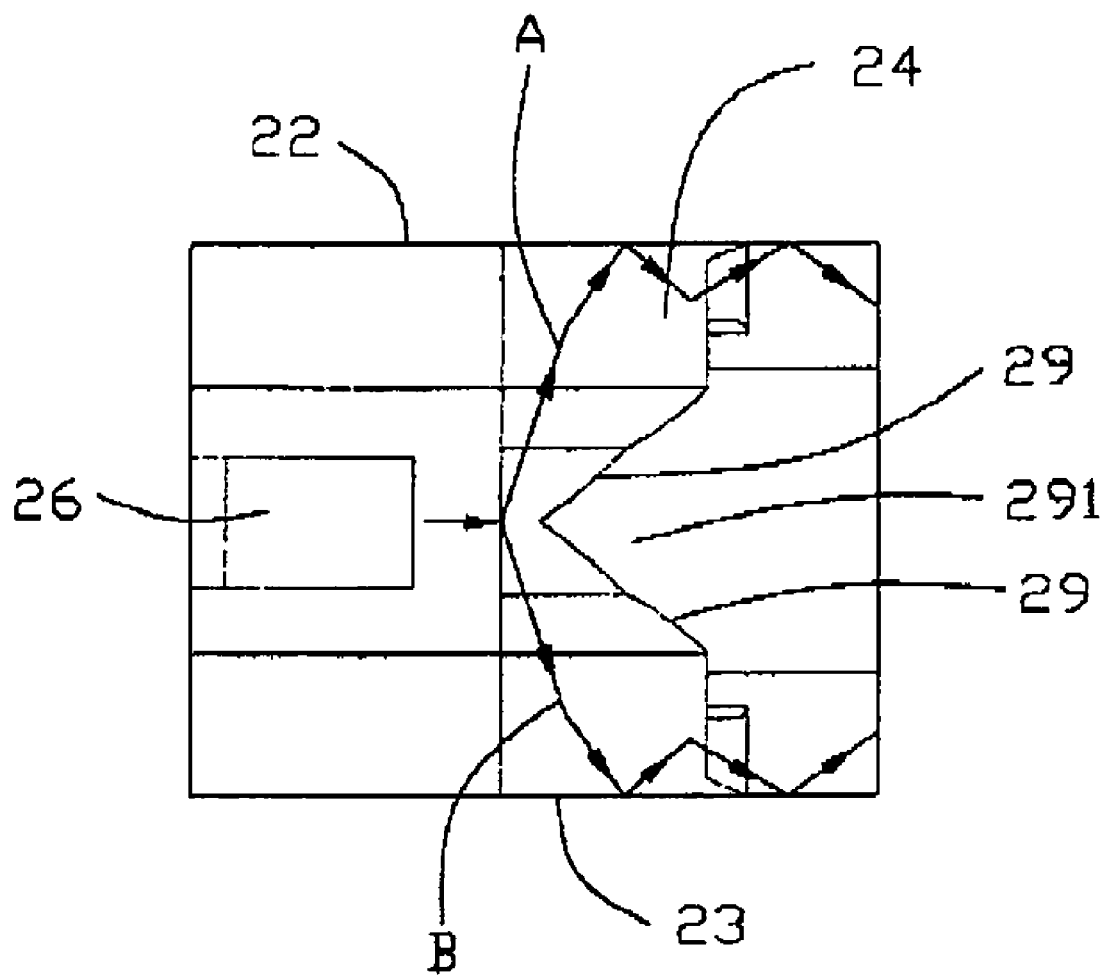
FIG. 12 is a side elevational view of the waveguide.

When the assembling is completed, the front end face of the waveguide 2 will be in a position relative to mating opening 15 of the cable assembly or the bezel 8 where the connector or more accurately speaking, the waveguide 2 is visible from outside. FIG. 12 specifically shows how the ray or light path from the LED 72 or a suitable lighting source is guided through the waveguide 2, as indicated by the arrow lines "A" and "B," to eventually illuminate especially a front end face of the waveguide 2. Also shown is a notch 291 defining or defined by two inclined faces 29 for properly guiding the light ray.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector comprising:
   a connector subassembly having a front mating portion;
   a waveguide configured as a sleeve and disposed around the front mating portion of the connector subassembly, the waveguide comprising a front end face at an end thereof; and
   an illumination device retained to the waveguide and illuminating the front end face of the waveguide, the illumination device having an LED retained to the waveguide; wherein
   the waveguide comprises a slit receiving the LED.

2. The electrical connector as claimed in claim 1, wherein the connector subassembly comprises a front cover bearing against the rear end of the waveguide and having a passage; and the illumination device comprises one or more conducting wires received in the passage of the front cover.

3. The electrical connector as claimed in claim 1, wherein the connector subassembly comprises a rear cover molded over at least a portion of the illumination device.

4. The electrical connector as claimed in claim 1, wherein the waveguide comprises a notch at a side thereof defining two inclined faces.

5. The electrical connector as claimed in claim 1, wherein the waveguide comprises a pair of fins arranged one above the other and the diverging toward a front thereof.

6. The electrical connector as claimed in claim 2, wherein the front cover of the connector subassembly comprises an over-travel spring situated behind the waveguide and the over-travel spring resists the waveguide in a front-to-back direction.

7. The electrical connector as claimed in claim 1, wherein the connector subassembly comprises a latching member at a lateral side portion thereof.

8. The electrical connector as claimed in claim 1, wherein the waveguide is made of transparent material.

9. The electrical connector as claimed in claim 1, wherein the connector subassembly comprises a Universal Serial Bus connector.

10. An electrical connector assembly comprising:
    a connector subassembly having a front mating portion;
    a bezel having a retaining frame and an opening, the retaining frame retaining the connector subassembly in position with the front mating portion of the connector subassembly extending to the opening; and
    a waveguide having a front portion disposed between a rim portion of the opening and the front mating portion of the connector subassembly; wherein
    the retaining frame comprises a receiving room and a projecting plate projecting into the receiving room for centering the waveguide.

11. The electrical connector as claimed in claim 10, wherein the bezel comprises a vertical plate containing the opening and the waveguide comprises a front end face lying substantially in a vertical plane defined by the plate.

12. The electrical connector as claimed in claim 10, wherein the retaining frame defines a retaining cutout at a lateral side thereof, and wherein the connector subassembly comprises a cover having a latching member engaging the cutout.

13. The electrical connector as claimed in claim 10, wherein the waveguide comprises a pair of fins diverging toward the projecting plate of the retaining frame, and wherein the projecting plate is tapered for effectuating a wedging action with the pair of fins.

14. The electrical connector as claimed in claim 13, wherein the connector subassembly further comprises a front cover and an over-travel spring tab retained to the front cover, the spring tab engaging with the projecting plate.

15. The electrical connector as claimed in claim 10, wherein the retaining frame defines a plurality of cutout at a rear thereof.

16. An electrical connector assembly comprising:
    a connector subassembly having a front mating portion;
    a bezel having a retaining frame and an opening, the retaining frame retaining the connector subassembly in position with the front mating portion of the connector subassembly extending to the opening; and
    a waveguide having a front portion disposed intimately and communicatively between a rim portion of the opening and the front mating portion of the connector subassembly; wherein
    the retaining frame defines a retaining cutout at a lateral side of thereof, and wherein the connector subassembly comprises a cover having a latching member engaging the cutout.

17. The electrical connector assembly as clamed I claim 16, wherein said waveguide intimately surrounds the front mating portion of the connector subassembly.

18. The electrical connector assembly as claimed in claim 16, wherein the waveguide comprises at a side thereof a notch defining two inclined faces.

19. The electrical connector assembly as claimed in 16, wherein an illumination device retained to the waveguide and illuminating the front end face of the waveguide, and the connector subassembly comprises a rear cover molded cover at least a portion of the illumination device.

20. The electrical connector assembly as claimed in claim 16, wherein the waveguide comprises a pair of fins with a gap therebetween.

* * * * *